(12) United States Patent
Bhatia et al.

(10) Patent No.: US 10,005,564 B1
(45) Date of Patent: Jun. 26, 2018

(54) AUTONOMOUS CARGO HANDLING SYSTEM AND METHOD

(71) Applicant: GOODRICH CORPORATION, Charlotte, NC (US)

(72) Inventors: Amit Bhatia, Fremont, CA (US); Zamira Daw Perez, Albany, CA (US); Alessandro Pinto, Kensington, CA (US); Julian C. Ryde, Alameda, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days. days.

(21) Appl. No.: 15/587,769

(22) Filed: May 5, 2017

(51) Int. Cl.
*G08B 21/00* (2006.01)
*B64D 45/00* (2006.01)
*B64C 1/20* (2006.01)

(52) U.S. Cl.
CPC ............... *B64D 45/00* (2013.01); *B64C 1/20* (2013.01)

(58) Field of Classification Search
CPC ................................. B64D 45/00; B64C 1/20
See application file for complete search history.

(56) References Cited

U.S. PATENT DOCUMENTS

| | | | |
|---|---|---|---|
| 6,871,823 B2 | 3/2005 | Roberts | |
| 7,198,227 B2* | 4/2007 | Olin | B64D 9/00 244/118.1 |
| 7,387,276 B1* | 6/2008 | Smith | B64C 1/1415 244/1 R |
| 8,185,234 B2 | 5/2012 | Tietjen et al. | |
| 8,308,107 B2 | 11/2012 | Hettwer | |
| 8,515,656 B2 | 8/2013 | Reed et al. | |
| 8,570,377 B2* | 10/2013 | Hofman | G06K 9/209 348/143 |
| 8,694,235 B2 | 4/2014 | Eadie | |
| 8,768,608 B2* | 7/2014 | Scherenberger | G06Q 50/28 244/137.1 |
| 8,788,085 B2 | 7/2014 | Panzram et al. | |
| 9,022,208 B2 | 5/2015 | Huber | |
| 9,075,412 B2 | 7/2015 | Dixon et al. | |
| 9,096,317 B2 | 8/2015 | Huber | |
| 9,162,765 B2 | 10/2015 | Huber | |
| 9,340,286 B2 | 5/2016 | Panzram et al. | |
| 9,382,004 B2 | 7/2016 | Huber | |
| 2003/0093187 A1* | 5/2003 | Walker | B64C 13/20 701/1 |
| 2004/0086364 A1* | 5/2004 | Watanabe | B25J 9/0084 414/416.01 |

(Continued)

*Primary Examiner* — Joseph Feild
*Assistant Examiner* — Rufus Point
(74) *Attorney, Agent, or Firm* — Snell & Wilmer, L.L.P.

(57) ABSTRACT

An autonomous cargo handling system is provided. The autonomous cargo handling system may comprise one or more sensing agents in electronic communication with each other. One or more of the sensing agents may be configured to monitor a sensing zone in a cargo deck to detect objects traveling through the sensing zone. In response to detecting an object, one or more sensing agents may determine an object property based on the detected object. One or more sensing agents may generate an object model based on the determined object properties. The sensing agents may also determine whether the detected object is a unit load device (ULD) or a non-ULD object based on the object property and/or the object model.

16 Claims, 6 Drawing Sheets

(56) References Cited

U.S. PATENT DOCUMENTS

| | | | |
|---|---|---|---|
| 2006/0093088 A1* | 5/2006 | Sowerby | G01N 23/09 378/63 |
| 2006/0186271 A1 | 8/2006 | Jacobsen | |
| 2007/0143979 A1* | 6/2007 | Townsend | B23P 19/041 29/402.01 |
| 2008/0167760 A1* | 7/2008 | Scherenberger | G06Q 10/08 701/3 |
| 2008/0281618 A1* | 11/2008 | Mermet | G06Q 10/08 705/1.1 |
| 2009/0121085 A1* | 5/2009 | Hettwer | B64D 9/00 244/137.1 |
| 2009/0304482 A1* | 12/2009 | Sanford | B64D 9/00 414/495 |
| 2010/0018836 A1* | 1/2010 | Kikkawa | B23Q 7/1431 198/339.1 |
| 2010/0213313 A1* | 8/2010 | Reed | B64D 9/00 244/118.1 |
| 2011/0255663 A1* | 10/2011 | Roy | G01V 5/0016 378/57 |
| 2012/0101636 A1 | 4/2012 | Huber et al. | |
| 2012/0274784 A1* | 11/2012 | Hofman | G06K 9/209 348/169 |
| 2012/0275485 A1* | 11/2012 | Holzner | B64C 1/20 374/1 |
| 2012/0312926 A1 | 12/2012 | Holzner et al. | |
| 2012/0314030 A1* | 12/2012 | Datta | G06K 9/00771 348/44 |
| 2013/0342353 A1* | 12/2013 | Choi | G06K 7/10366 340/686.1 |
| 2015/0298808 A1* | 10/2015 | Huber | G01C 21/00 701/25 |
| 2016/0018253 A1* | 1/2016 | O'Neil | G01G 19/083 177/25.13 |
| 2016/0117536 A1* | 4/2016 | Johnsen | G06K 7/10366 340/3.1 |
| 2016/0332554 A1* | 11/2016 | Ambrosio | B60P 1/43 |
| 2017/0336195 A1* | 11/2017 | Suzuki | G01B 11/022 |

* cited by examiner

AUTONOMOUS CARGO HANDLING SYSTEM AND METHOD

FIELD

The present disclosure relates to cargo handling systems, and more specifically, to an autonomous cargo handling system and method.

BACKGROUND

Conventional aircraft cargo systems typically include various tracks and rollers that span the length of an aircraft. Cargo systems, such as those used by aircraft for transport of heavy containerized cargo or pallets, also referred to as unit load devices (ULD's), typically include roller trays containing transport rollers which rollably support the cargo. Motor driven rollers may be employed in these systems. Aircraft often employ a series of motor driven power drive units (PDU's) to propel cargo containers and pallets within the aircraft cargo compartment. This configuration can allow for the transportation of cargo pallets within the aircraft cargo compartment by one or more human operators controlling the PDU's through various controller panels located externally or within the aircraft. Typically, the human operators are responsible for ensuring safety during the loading process and may manually place the cargo through a loading plan, manual visual tracking of cargo, and/or via the control panels.

SUMMARY

In various embodiments, a sensing agent is disclosed. The sensing agent may comprise a sensing unit configured to monitor a sensing zone. The sensing agent may comprise a computing unit in electronic communication with the sensing unit. In response to the sensing unit detecting an object in the sensing zone, the computing unit may be configured to determine an object property based on the object. The computing unit may be configured to identify the object as a ULD or a non-ULD object based on the object property.

In various embodiments, the object property may comprise at least one of an image of the object, a video of the object, an object dimension, an object shape, an object characteristic, an object orientation, an object location, an object weight, or point cloud data, wherein the object property does not include a reading of an identification tag or label. The sensing unit may comprise at least one of a camera, a structured light sensor, a light detection and ranging (LiDAR) sensor, an infrared sensor, a depth sensor, a 3D scanner, an ultrasound range finder, a radar sensor, or a weight sensor. The computing unit may be configured to generate an object model based on the object property. The computing unit may be configured to identify the object as the ULD or the non-ULD object based on the object model. The computing unit may be configured to generate a non-ULD alert in response to detecting the non-ULD object. The non-ULD alert may be generated based on an alert rule.

In various embodiments, a method is disclosed. The method may comprise the steps of: monitoring, by a sensing agent, a cargo deck, wherein the sensing agent is configured to monitor a sensing zone defining a logical boundary within the cargo deck; detecting, by the sensing agent, an object in the cargo deck in response to the object being moved into the sensing zone; determining, by the sensing agent, an object property based on the object; and identifying, by the sensing agent, the object as a ULD or a non-ULD object based on the object property.

In various embodiments, the method may also comprise the step of generating, by the sensing agent, an object model based on the object property. The step of identifying the object as the ULD or the non-ULD object may comprise comparing at least one of the object model or the object property against at least one of a stored ULD model or a stored ULD property. The object property may comprise at least one of an image of the object, a video of the object, an object dimension, an object shape, an object characteristic, an object orientation, an object location, an object weight, or point cloud data, wherein the object property does not include a reading of an identification tag or label. The method may further comprise the step of generating, by the sensing agent, a non-ULD alert in response to identifying the object as the non-ULD object. The non-ULD alert may be generated based on an alert rule. The sensing agent may comprise at least one of a sensing unit, a computing unit, or a communication unit in electronic communication with each other. The sensing unit may comprise at least one of a camera, a structured light sensor, a light detection and ranging (LiDAR) sensor, an infrared sensor, a depth sensor, a 3D scanner, an ultrasound range finder, a radar sensor, or a weight sensor.

In various embodiments, an aircraft is disclosed. The aircraft may comprise a cargo deck defined by an aircraft envelope within the aircraft. The aircraft may comprise a sensing agent coupled to the aircraft envelope. The sensing agent may be configured to monitor a sensing zone defining a logical boundary within the cargo deck. In response to the sensing agent detecting an object in the sensing zone, the sensing agent may be configured to determine an object property based on the object. The sensing agent may be configured to identify the object as a ULD or a non-ULD object based on the object property.

In various embodiments, the object property may comprise at least one of an image of the object, a video of the object, an object dimension, an object shape, an object characteristic, an object orientation, an object location, an object weight, or point cloud data, wherein the object property does not include a reading of an identification tag or label. The sensing agent may be coupled to the aircraft envelope on at least one of a cargo deck ceiling or an inner surface of the aircraft envelope. The sensing agent may comprise at least one of a sensing unit, a computing unit, or a communication unit in electronic communication with each other. The sensing unit may comprise at least one of a camera, a structured light sensor, a light detection and ranging (LiDAR) sensor, an infrared sensor, a depth sensor, a 3D scanner, an ultrasound range finder, a radar sensor, or a weight sensor.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. An X-Y-Z axis has been provided throughout the figures for ease of illustration.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

Cargo handling systems, as disclosed herein, may be used to load, move, and unload cargo. The present disclosure describes an autonomous cargo handling system that may be used for identification and location-based control of unit load devices ULD's or non-ULD's (e.g., human operators, or other non-ULD objects). Such systems may be used in aircraft cargo systems. However, the systems and methods of the present disclosure may also be suitable for use in non-aircraft cargo handling systems.

Figure 1A:
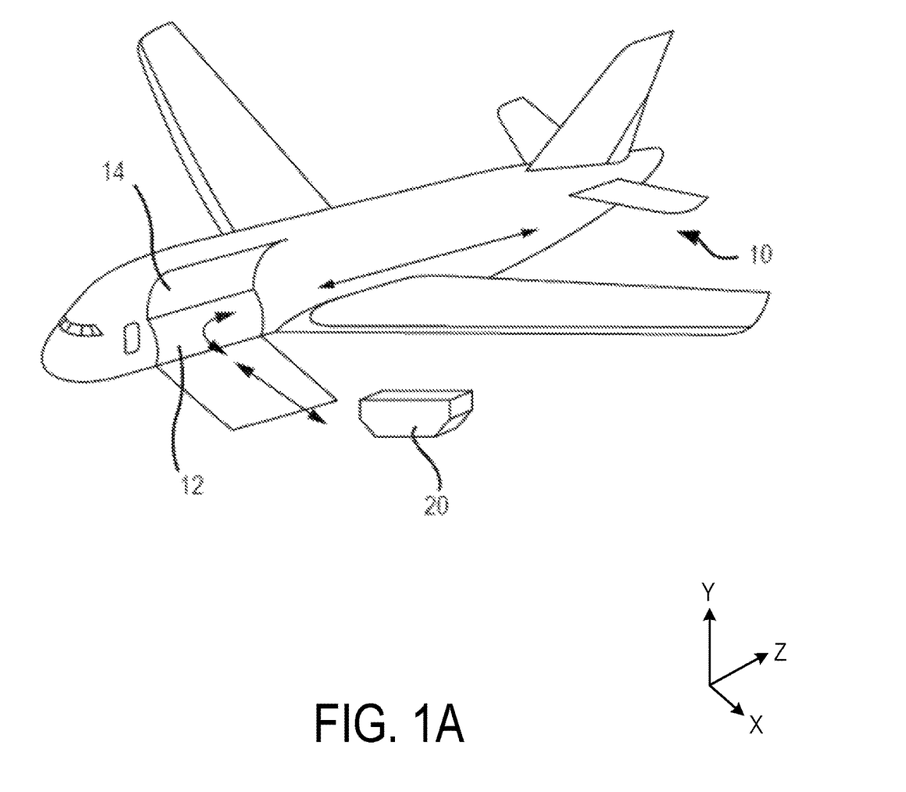
FIG. 1A illustrates a schematic view of an aircraft being loaded with cargo, in accordance with various embodiments.

In various embodiments, and with reference to FIG. 1A, a schematic view of an aircraft 10 having a cargo deck 12 is illustrated. Aircraft 10 may comprise a cargo load door 14, for example, at a side of the fuselage structure of aircraft 10, at an aft end of the fuselage structure, and/or at any other suitable location. Cargo 20 may be loaded through cargo load door 14 and onto cargo deck 12 of aircraft 10 or unloaded from cargo deck 12 of aircraft 10. Although cargo 20 is illustrated as a cargo container, cargo 20 could also be a pallet, an irregularly shaped object, an irregularly shaped container, or other cargo.

Items to be shipped by air, freight, and/or the like are typically loaded first onto specially configured pallets or into specially configured containers. In aviation, those various pallets and/or containers commonly are referred to as unit load devices (ULD's). ULD's are available in various sizes and capacities, and are typically standardized in dimension and shape. Once loaded with cargo items, the ULD is transferred to aircraft 10, and is loaded onto aircraft 10 through cargo load door 14 using a conveyor ramp, scissor lift, or the like. Once inside aircraft 10, the ULD is moved within cargo deck 12 to its final stowage position, as discussed further herein. Multiple ULD's may be brought on-board aircraft 10, during one or more loading procedures (e.g., at separate destinations), with each ULD being placed in its respective stowage and transportation position in cargo deck 12. After aircraft 10 has reached its destination, one or more ULD's may be unloaded from aircraft 10 similarly, but in reverse sequence to the loading procedure.

Figure 1B:
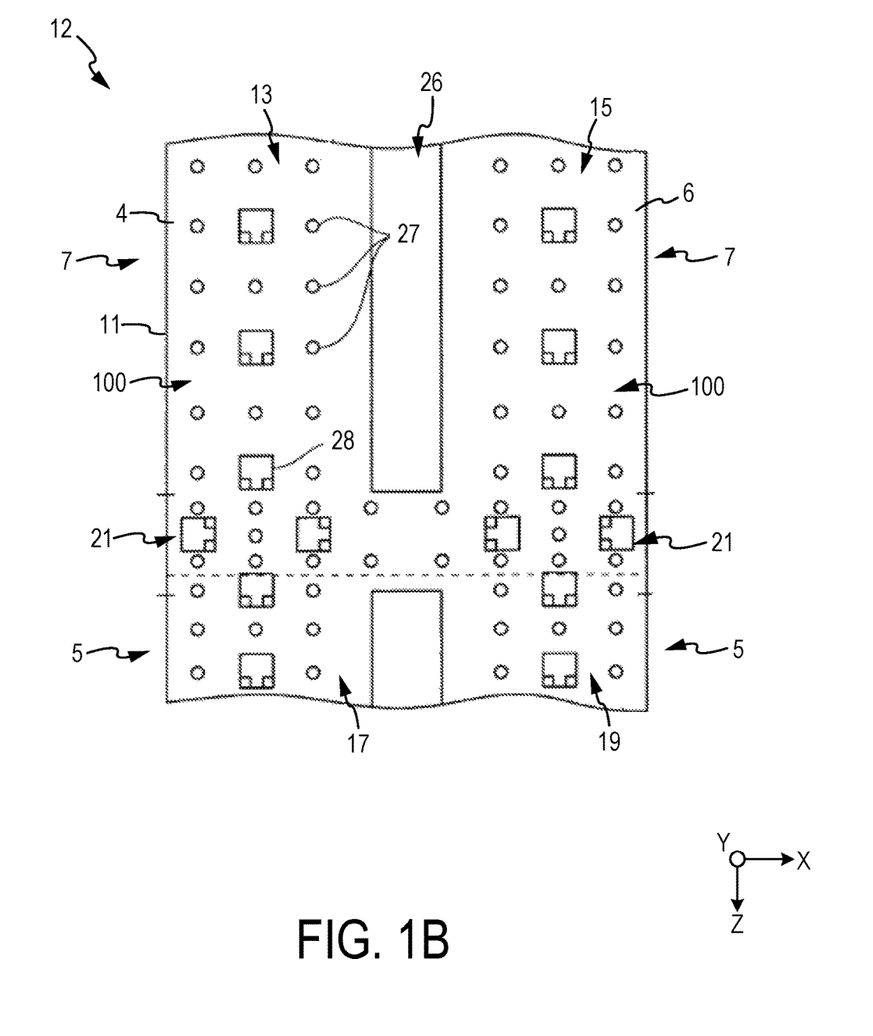
FIG. 1B illustrates a top view of a cargo deck for the aircraft of FIG. 1A, in accordance with various embodiments.

In various embodiments, and with reference to FIG. 1B and continued reference to FIG. 1A, cargo deck 12 is illustrated in greater detail. A generally H-shaped conveyance surface 26 may form cargo deck 12, adjacent to cargo load door 14. However, there are many other aircraft cargo deck configurations to which the embodiments of the disclosure can be implemented. For example, various aircraft, particularly those designed primarily for the transportation of cargo without passengers, may have the upper passenger deck removed and an additional larger cargo deck installed. Other aircraft may have three or more parallel longitudinal tracks rather than the H-shape depicted in FIG. 1B.

The cargo compartment may be defined by an inner wall of aircraft 10 (e.g., an aircraft envelope 11), and may include a cargo loading system comprising a plurality of freely rotating conveyance rollers 27 mounted in cargo deck 12 to define a conveyance plane. Cargo 20 loaded onto cargo deck 12 can be moved manually throughout the cargo bay upon conveyance rollers 27. However, it may be desirable to electro-mechanically propel cargo 20 with minimal or no manual assistance. In that regard, the H-shaped conveyance surface 26 may include a number of power drive units (PDU's) 28 that provide a mechanism upon which cargo 20 is propelled over conveyance rollers 27. Each PDU 28 typically includes a drive roller element which can be raised from a lowered position beneath cargo deck 12 to an elevated position. These PDU's are referred to as "self-lift" PDU's. In the elevated position, the drive roller element contacts and drives the overlying cargo that rides on conveyance rollers 27. Other types of PDU's, which can also be used as embodiments of the present disclosure, are above the conveyor plane all the time and held up by a spring. These PDU's may be referred to as "spring-lift" PDU's.

In the longitudinal direction, conveyance surface 26 may include a left track 4 and a right track 6 along which cargo 20 is to be stowed in parallel columns during flight. In the transverse direction, cargo deck 12 may also be logically separated into a tail (or "aft") section 5 and a forward section 7. Thus, the left and right tracks 4, 6 may be divided into four sections, two forward sections (e.g., a left forward section 13 and a right forward section 15) and two aft sections (e.g., a left aft section 17 and a right aft section 19). In addition to the four sections, there may be an additional path 21 between both tracks 4, 6 proximate cargo load door 14. This additional path 21 divides the cargo bay between forward section 7 and aft section 5. Additional path 21 is used to move cargo 20 into and out the aircraft 10, and also to transfer cargo 20 between the left track 4 and right track 6.

In various embodiments, a human operator may interface with an operator interface unit to provide motive force for the cargo (e.g., to facilitate movement of the ULD along cargo deck 12). For example, and in accordance with various embodiments, the human operator may manipulate control elements to selectively and electrically energize PDU's 28 in each of the five aforementioned sections 13, 15, 17, 19, and 21, to provide motive force for the cargo. Typically, these control elements may be mounted in an operator interface unit external, internal, or portable from aircraft 10. These controls will typically have an on/off switch and a joystick which, depending on the direction pushed, will energize a set of PDU's 28, causing groups of drive roller elements to be elevated (if not already elevated) and rotated in one of two possible directions (i.e., forward or reverse). The set of PDU's 28 may remain energized as long as the joystick is held in a corresponding position. In response to release of the joystick, the selected set of PDU's 28 may be de-energized to stop movement. In the case of self-lifting PDU's 28, the drive roller elements are then returned to their retracted position below the plane of the conveyance rollers 27; in the case of spring-lift PDU's 28, the PDU's 28 may remain biased in the upward position and brakes may be applied to hold cargo 20 in place. As a further example, and in accordance with various embodiments, the human operator may interface with the operator interface unit to select a location to move the ULD to. The operator interface unit may then selectively and electrically energize PDU's 29 to provide motive force for the ULD to move the ULD into the selected location. As a further example, and in accordance with various embodiments, the ULD's may also be loaded into cargo deck 12 using an autonomous control system. In that respect, and as discussed further herein, the autonomous control system may selectively and electrically energize PDU's 29 corresponding to a predetermined location in cargo deck 12 to store the ULD.

In various embodiments, and to facilitate movement of a ULD along cargo deck 12, aircraft 10 may include an autonomous cargo handling system 100. Autonomous cargo handling system 100 may be configured to monitor and gather data during the cargo loading process. For example, in various embodiments, autonomous cargo handling system 100 may, among other things, monitor and gather data about the cargo loading process to more accurately control the movement of ULD's; assess and detect possible collisions of ULD's with aircraft envelope 11, humans in cargo deck 12, and/or other objects; detect non-ULD's (e.g., human operators, etc.) in cargo deck 12; monitor the PDU's; predict a current dynamic model of the PDU's; and/or various other operations, as discussed herein. In that regard, and in accordance with various embodiments, autonomous cargo handling system 100 may provide information about the status of all ULD's and/or PDU's in cargo deck 12, as well as humans and/or other unexpected objects, in order to control the movement of ULD's through cargo deck 12 with a greater level of autonomy and safety and at a lower cost than cargo systems requiring greater human interaction.

Figure 2A:
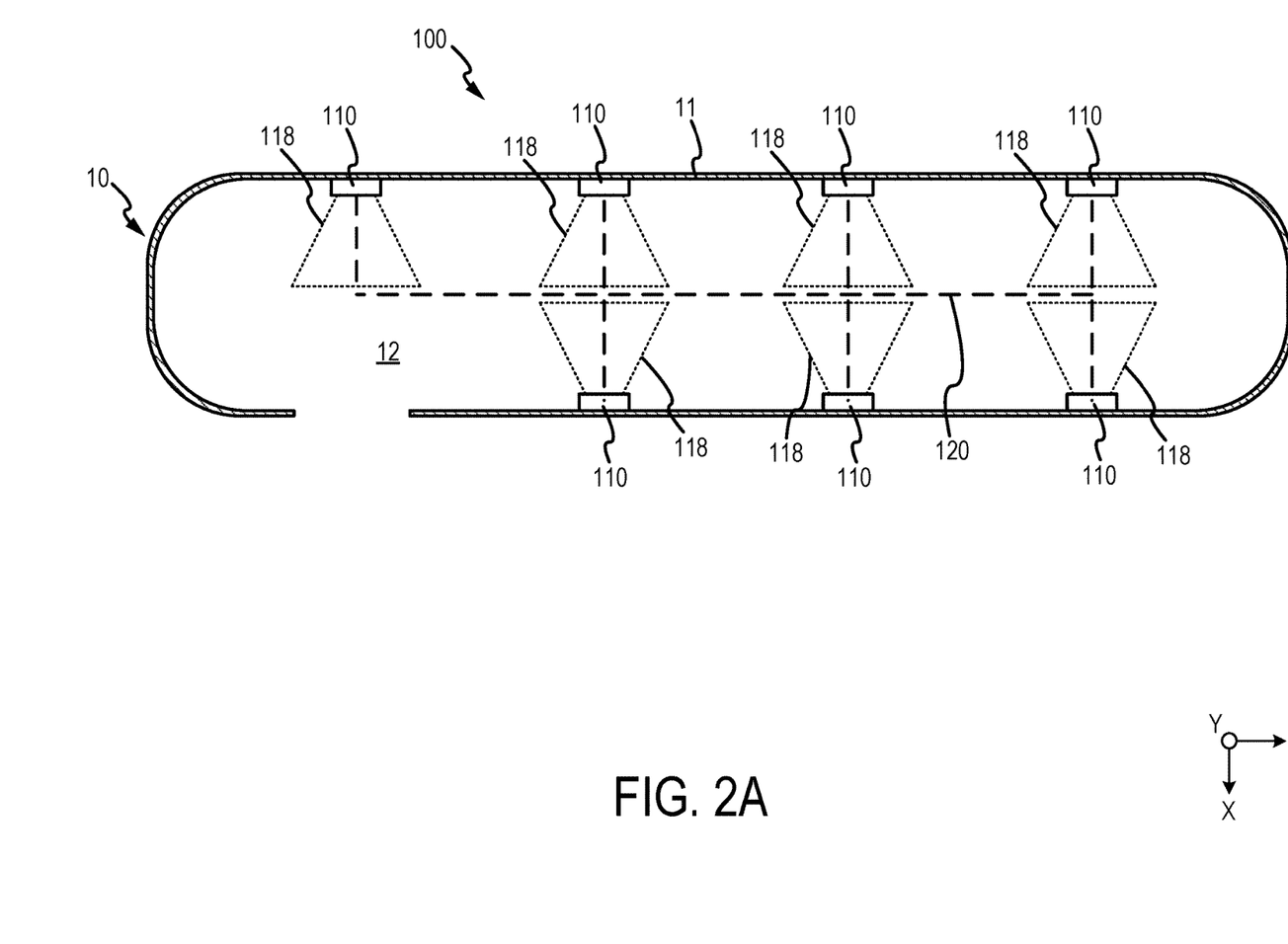
FIG. 2A illustrates a top view of an autonomous cargo handling system, in accordance with various embodiments.

With reference to FIG. 2A, autonomous cargo handling system 100 is depicted in greater detail. In various embodiments, autonomous cargo handling system 100 may comprise one or more sensing agents 110 (e.g., a first sensing agent, a second sensing agent, an Nth sensing agent, etc.). Each sensing agent 110 may be configured to monitor and gather data during the cargo loading process. Sensing agents 110 may be located in any suitable location in cargo deck 12 capable of monitoring the cargo loading process. For example, and in various embodiments, sensing agents 110 may be coupled to an inner surface of aircraft envelope 11, a cargo deck ceiling, and/or at any other suitable location. Sensing agents 110 may be located at any suitable location on aircraft envelope 11 along the Y axis, such as, for example, at a midpoint from the cargo desk ceiling and the cargo deck floor. Sensing agents 110 may be stationary or may be configured to rotate and/or move along the X, Y, and/or Z axis. Sensing agents 110 may be dispersed throughout cargo deck 12 to at least partially ensure monitoring coverage throughout cargo deck 12, as discussed further herein (e.g., to create a distributed network of sensing agents 110).

In various embodiments, each sensing agent 110 may comprise any suitable apparatus capable of monitoring and gathering data during the cargo loading process. Each sensing agent 110 may also be computer based, and may comprise a processor, a tangible non-transitory computer-readable memory, and/or a network interface, along with other suitable system software and hardware components. Instructions stored on the tangible non-transitory memory may allow each sensing agent 110 to perform various functions, as described herein.

System program instructions and/or processor instructions may be loaded onto a tangible, non-transitory, computer-readable medium (also referred to herein as a tangible, non-transitory, memory) having instructions stored thereon that, in response to execution by a controller (e.g., system control 330, with brief reference to FIG. 3), cause the processor to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

In various embodiments, each sensing agent 110 may also comprise various sub-components to aid in monitoring and gathering data in cargo deck 12. For example, and with reference to FIG. 2B, each sensing agent 110 may comprise a sensing unit 112, a computing unit 114, and/or a communication unit 116. Sensing unit 112, computing unit 114, and/or communication unit 116 may be in operative and/or electronic communication with each other. As discussed further herein, computing unit 114 may include logic configured to control sensing unit 112 and/or communication unit 116. In various embodiments, each sensing agent 110 may also comprise any other suitable and/or desirable subcomponent, such as, for example an actuation component configured to provide an actuating force to one or more PDU's in cargo deck 12. In that respect computing unit 114, via communication unit 116 or via direct control of the actuation component, may variably control the PDU's.

Figure 2B:
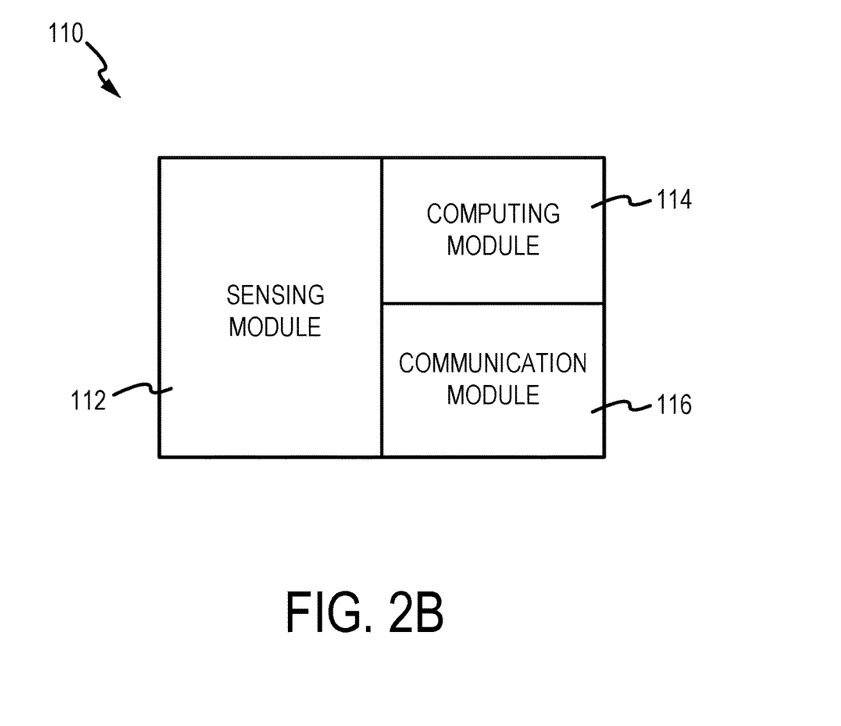
FIG. 2B illustrates a block diagram of an exemplary sensing agent, in accordance with various embodiments.

In various embodiments, sensing unit 112 may comprise any suitable apparatus, hardware, and/or software capable of monitoring a portion of cargo deck 12. Each sensing agent 110 may comprise one or more sensing units 112. For example, sensing unit 112 may comprise at least one of a camera, a structured light sensor, a light detection and ranging (LiDAR) sensor, an infrared sensor, a depth sensor (e.g., a MICROSOFT® Kinect®, an ASUS® Xtion PRO®, etc.), a 3D scanner, an ultrasound range finder, a radar sensor, and/or any other suitable sensing device. Each sensing unit 112 may also comprise sensors to sense a weight of an object (a "weight sensor") such as, for example, a pressure sensor, a piezo-electric sensor, and/or the like.

In various embodiments, computing unit 114 may comprise any suitable computing device capable of controlling sensing agent 110. For example, computing unit 114 may include a processor and a tangible, non-transitory memory. Computing unit 114 may comprise one or more logic modules that implement logic to control sensing unit 112 and/or communication unit 116. Computing unit 114 may include a general purpose processor, a digital signal processor (DSP), an application specific integrated circuit (ASIC), a field programmable gate array (FPGA) or other programmable logic device, discrete gate or transistor logic, a graphics processing unit (GPU), discrete hardware components, or any combination thereof. In various embodiments, use of a computing unit 114 in each individual sensing agent 110 may allow each sensing agent to perform processing operations locally (e.g., decentralized), thus at least partially reducing the bandwidth requirements relative to a central processing system (e.g., transmitting high bandwidth data, such as a video feed, to a central processing location).

In various embodiments, communication unit 116 may comprise any suitable communications interface. Communication unit 116 may allow data to be transferred between sensing agents 110. Examples of communication units 116 may include a modem, a network interface (such as an Ethernet card), a communications port, a Personal Computer Memory Card International Association (PCMCIA) slot and card, etc. Data transferred via communication unit 116 may be in the form of signals which may be electronic, electromagnetic, optical, or other signals capable of being transmitted and received by corresponding communication units 116. These signals are provided to communication unit 116 via a communications path (e.g., network 120). Network 120 may carry signals and may be implemented using wire, cable, fiber optics, a telephone line, a cellular link, a radio frequency (RF) link, wireless, and/or other communications channels. In that regard, network 120 may interconnect each sensing agent 110, via each corresponding communication unit 116.

In various embodiments, and with reference again to FIG. 2A, sensing agents 110 may be configured to perform one or more tasks during the cargo loading process. For example, sensing agents 110 may be configured to perform a ULD localization task, a non-ULD detection task, and/or a ULD modeling task. As discussed further herein, during the ULD localization task, which may comprise two subtasks (a zone ULD localization task and a global ULD localization task), sensing agents 110 may monitor sensing zones 118 to locate and generate data on objects within each sensing zone 118. As discussed further herein, during the non-ULD detection task, sensing agents 110 may analyze the data generated during the ULD localization task to determine whether the object is a ULD or a non-ULD object. As discussed further herein, during the ULD modeling task, sensing agents 110 may generate an object model based on the generated data from the ULD localization task. In various embodiments, sensing agents 110 may also be configured to perform various other tasks during the cargo loading process, such as, for example, ULD motion control, prognostics and health management of autonomous cargo handling system 100, PDU model updating (e.g., updating a PDU model based on monitoring of the ULD's), weight and balance assessment of ULD's, and/or any other suitable and/or desired task.

In various embodiments, during the ULD localization task, sensing agents 110 may be configured to track the location of each ULD loaded into cargo deck 12. In that respect, each sensing agent 110 may be configured to monitor a sensing zone 118 defined as a logical area in cargo deck 12 that each sensing agent 110 is configured to monitor. For example, each sensing zone 118 may comprise any suitable distance, such as, for example about 1.0 feet (0.305 meters) to about 5.0 feet (1.52 meters), about 5.0 feet (1.52 meters) to about 10.0 feet (3.05 meters), about 10.0 feet (3.04 meters) to about 15 feet (4.57 meters), and/or any other suitable sensing area with respect to a tolerance that may be location dependent (wherein about as used in this context refers only to +/−0.5 feet (0.15 meters)). Each sensing zone 118 may define a distinct logical area of cargo deck 12. In various embodiments, each sensing zone 118 may also at least partially overlap with a nearby sensing zone 118 to ensure sensing coverage and/or to create redundancy in monitored areas of cargo deck 12.

In various embodiments, sensing agents 110 may be configured to perform a zone ULD localization task and/or a global ULD localization task in cargo deck 12 during the ULD localization task. During the zone ULD localization task, each sensing agent 110 may monitor its corresponding sensing zone 118. In various embodiments, each sensing agent 110 may be configured to continuously monitor its corresponding sensing zone 118, monitor at a defined time interval (e.g., every minute, etc.), and/or the like. In response to an object (e.g., a ULD or a non-ULD object) entering the corresponding sensing zone 118, sensing agent 110 may determine an object property. For example, an object property may comprise one or more data points related to the object, such as, an image of the object, a video of the object, an object dimension (e.g., length, width, height, etc.), an object shape, an object characteristic (e.g., edges, corners, textures, etc. of the object), an object orientation, an object location, an object weight, point cloud data, an identification tag, and/or the like. In various embodiments, the object property may not include a reading of an ID tag, label, and/or the like, such that the object may be identified based on scanning physical properties of the object, as discussed further herein. As a further example, the point cloud data may comprise a set of data points in a three-dimensional coordinate system representing the external surfaces of the object. In that regard, sensing agent 110 may generate the point cloud data to further aid in determining object dimensions, object shape, object characteristics, object orientation, and/or similar characteristics of the object. As a further example, the identification tag determined by sensing agent 110 may comprise an adhesive tag, an RFID tag, a label, a bar code, and/or other information tagged onto the object. In that respect, the identification tag may correspond to predetermined data regarding the object. As a further example, sensing agent 110 may implement perception logic to determine the object location (e.g., relative to cargo deck 12 and/or sensing agent 110). For example, each sensing agent 110 may be preloaded with a cargo deck operational map comprising data indicating the dimensions and physical characteristics of cargo deck 12, the PDU's, and/or the like. Each sensing agent 110 may use the cargo deck operational map together with the perception logic and one or more object properties to determine the object location within cargo deck 12.

In various embodiments, sensing agent 110 may generate an object model based on the object property. The object model may comprise one or more object properties determined by sensing agent 110, such as, for example, as metadata, tags, and/or the like. The object model may comprise a geometric representation of the object (e.g., a 2D object model, a 3D object model, etc.).

During the global ULD localization task, each sensing agent 110 may communicate, via network 120, with the remaining sensing agents 110 to identify the ULD's or non-ULD objects located throughout cargo deck 12. In that respect, sensing agents 110 may collectively track movement of each ULD or non-ULD object through cargo deck 12. Each sensing agent 110 may transmit the data generated during the zone ULD localization task (e.g., the object properties and/or the object models) to the other sensing agents 110 to collectively generate an object model relating to each ULD or non-ULD object in cargo deck 12. In that regard, sensing agents 110 may map the cargo deck 12 to monitor and track all ULD's or non-ULD objects in cargo deck 12. In various embodiments, each sensing agent 110 may also transmit the object properties and/or the object models to the other sensing agents 110 to collectively map the cargo deck 12 to monitor and track all ULD's or non-ULD objects in cargo deck 12. In that respect, sensing agents 110 may collectively track the movement of ULD's through cargo deck 12.

Figure 3:
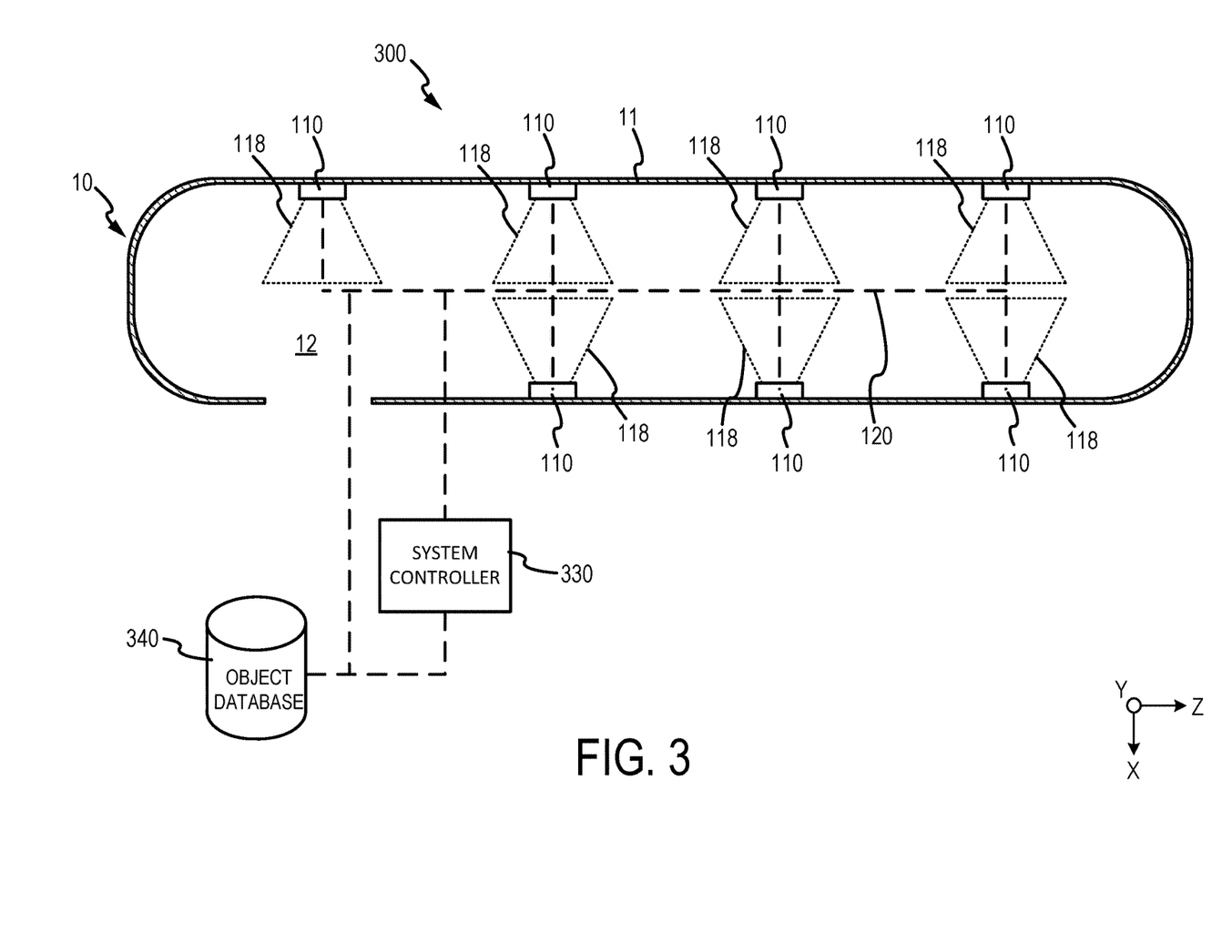
FIG. 3 illustrates a top view of an autonomous cargo handling system having a system controller, in accordance with various embodiments.

In various embodiments, and with reference to FIG. 3, autonomous cargo handling system 300 may comprise a system controller 330 in operative and/or electronic communication with an object database 340. System controller 330 may also be in operative and/or electronic communication with each sensing agent 110 via network 120. System controller 330 may be configured to control the sensing agents 110, as discussed further herein. System controller 330 may include a general purpose processor, a digital signal processor (DSP), an application specific integrated circuit (ASIC), a field programmable gate array (FPGA) or other programmable logic device, discrete gate or transistor logic, discrete hardware components, or any combination thereof. System controller 330 may include a processor and a tangible, non-transitory memory. In various embodiments, system controller 330 may also be in operative communication with the PDU's (e.g., PDU 28, with brief reference to FIG. 1B). In that respect, system controller 330 may be configured to control the PDU's based on the monitoring from sensing agents 310 (e.g., based on the object property, the object model, etc.). In various embodiments, each sensing agent 110 may also be in direct operative and/or electronic communication with object database 340, such that each sensing agent 110 may interact with object database 340 without first interfacing with system controller 330.

Object database 340 may comprise any suitable data structure, such as a database (including a relational, hierarchical, graphical, blockchain, or object-oriented structure and/or any other database configurations), a flat file structure, and/or the like. Object database 340 may be configured to store and maintain data relating to autonomous cargo handling system 300. For example, object database 340 may store and maintain stored ULD models comprising data of known object properties for ULD's. Object database 340 may also store generated object models, as discussed further herein. In accordance with various embodiments, object database 340 may also store any other suitable data related to autonomous cargo handling system 300, such as, for example, a health status of autonomous cargo handling system 300 (e.g., a health of each sensing agent 110, a health of each sensing agent subcomponent, etc.), PDU models, a location of each known object and/or ULD, a location of each non-ULD, object properties, cargo deck 12 information (e.g., the state of latches on the floor of cargo deck 12, etc.), and/or any other suitable data corresponding to a cargo area.

In various embodiments, during the non-ULD detection task, each sensing agent 110 may be configured to determine whether a detected object in the corresponding sensing zone 118 is a ULD or a non-ULD object. For example, sensing agent 110 may comprise logic to determine the type of object based on the object properties and/or the object model. In various embodiments, sensing agent 110 may also determine whether the object is a ULD or a non-ULD object by comparing the generated object model against a stored ULD model. For example, sensing agent 110 may transmit the object model to system controller 330. System controller 330 may analyze the object model and query object database 340 to compare the object model against stored ULD models. In response to being unable to locate a match of the object model, system controller 330 may transmit to the corresponding sensing agent 110 data indicating that the detected object is a non-ULD object. In response to locating a match of the object model, system controller 330 may transmit to the corresponding sensing agent 110 data indicating that the detected object is a ULD.

In response to detecting a non-ULD object, sensing agent 110 may be configured to generate and transmit a non-ULD alert. The non-ULD alert may be based on one or more alert rules. For example, the alert rules may comprise data commanding sensing agent 110 to generate a non-ULD alert in response to detecting a non-ULD object, to generate a non-ULD alert in response to the non-ULD object being in the path of an ULD, and/or any other suitable and/or desired alert rule. Sensing agent 110 may transmit the non-ULD alert to system controller 330. In various embodiments, system controller 330 may be configured to alert a human operator, communicate with the PDU's in cargo deck 12 to de-energize and cease movement of ULD's through the cargo deck, and/or the like.

In various embodiments, during the 3D ULD modeling task, each sensing agent 110 may be configured to transmit the generated object models and/or the object properties to object database 340, via system controller 330. System controller 330 may analyze the generated object models and/or object properties for consistency, accuracy, quality, and/or performance of each sensing agent 110. For example, in response to a single ULD being moved throughout cargo deck 12, various sensing agents 110 may each generate separate object models and/or object properties. In that respect, each object model and/or object properties may be compared to each other to detect any internal faults in each sensing agent 110 (e.g., a malfunctioning of occluded sensor unit, poor quality of localization, faulty communication units, local power outages, hardware and mechanical failures, incorrect positioning of sensing agent 110 in cargo deck 12, etc.), to notify a human operator, and/or to take remedial actions to resolve the detected issues. For example, system controller 330 may comprise logic to generate calibration commands to transmit to the faulty sensing agent 110. The calibration commands may comprise data commanding a sensing agent 110 to reposition, run diagnostics, and/or the like.

Figure 4:
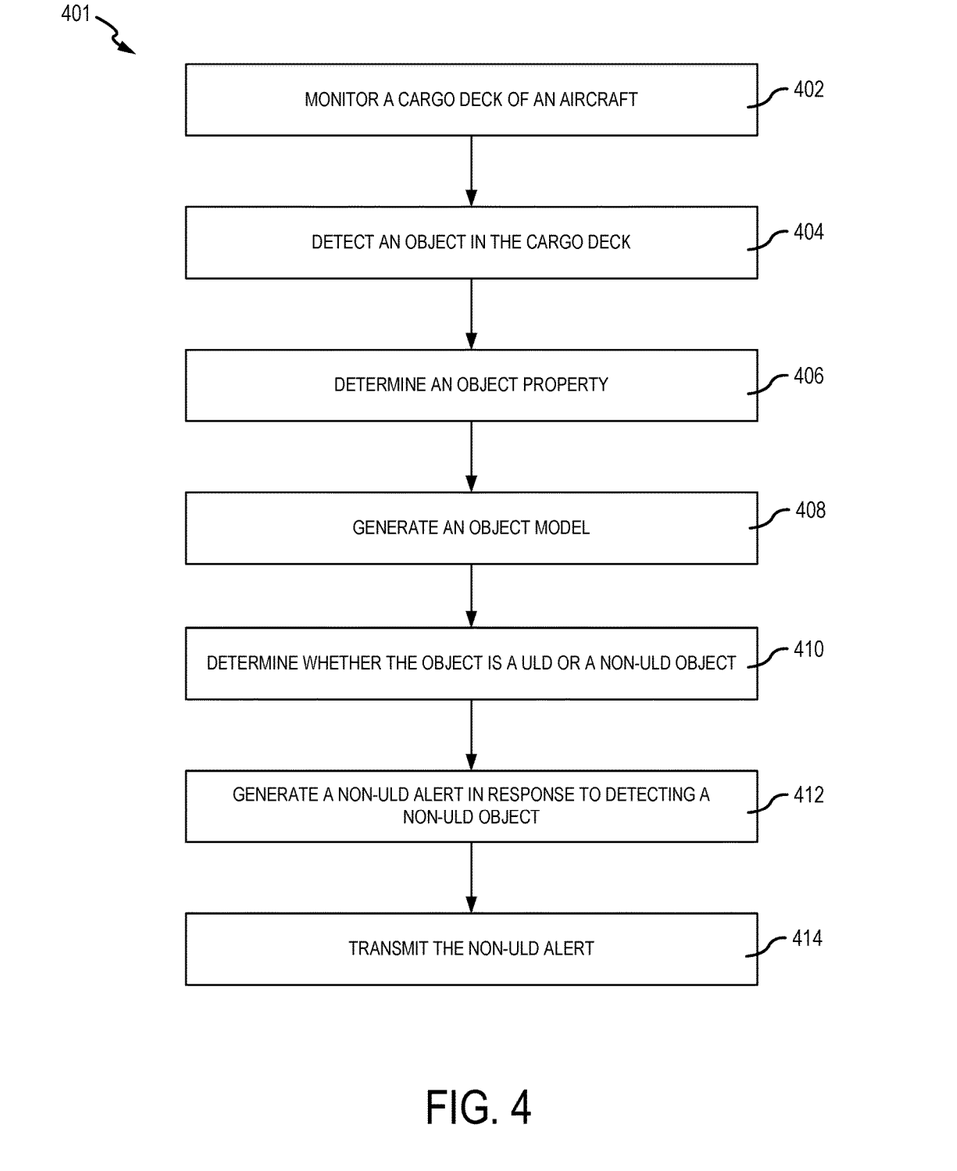
FIG. 4 illustrates a process flow for a method of monitoring a cargo loading process, in accordance with various embodiments.

In various embodiments, and with reference to FIG. 4 and FIG. 2A, a method 401 of monitoring a cargo loading process is disclosed. Method 401 may comprise monitoring a cargo deck of an aircraft (Step 402). One or more sensing agents 110 may be configured to monitor cargo deck 12. Each sensing agent 110 may be configured to monitor a discrete sensing zone 118 within cargo deck 12. Method 401 may comprise detecting an object in the cargo deck (Step 404). Sensing agent 110 may monitor the cargo deck and detect an object in response to the object entering the sensing zone 118 corresponding to the sensing agent 110. Method 401 may comprise determining an object property (Step 406). In response to detecting the object, sensing agent 110 may determine one or more object properties. For example, an object property may comprise one or more data points related to the object, such as, an image of the object, a video of the object, an object dimension (e.g., length, width, height, etc.), an object shape, an object characteristic (e.g., edges, corners, textures, etc. of the object), an object orientation, an object location, an object weight, point cloud data, an identification tag, and/or the like, as described further herein. In various embodiments, the object property may not include a reading of an ID tag, label, and/or the like, such that the object may be identified based on scanning physical properties of the object, as discussed further herein.

In various embodiments, method 401 may comprise generating an object model (Step 408). Sensing agent 110 may generate an object model based on the object property. The object model may comprise one or more object properties determined by sensing agent 110, such as, for example, as metadata, tags, and/or the like. The object model may comprise a geometric representation of the object (e.g., a 2D object model, a 3D object model, etc.).

In various embodiments, method 401 may comprise determining whether the object is a ULD or a non-ULD object (Step 410). Sensing agent 110 may be configured to determine whether the object is a ULD or a non-ULD object. For example, sensing agent 110 may comprise logic to determine whether the object is a ULD or a non-ULD based on the object properties and/or the object model. In various embodiments, sensing agent 110 may also determine whether the object is a ULD or a non-ULD object by comparing the generated object model against a stored ULD model. For example, and with brief reference again to FIG. 3, sensing agent 110 may transmit the object model and/or corresponding object properties to system controller 330. System controller 330 may analyze the object model and query object database 340 to compare the object model against stored ULD models. As a further example, and in various embodiments, sensing agents 110 may implement machine-learning algorithms and techniques to identify the detected object. For example, sensing agents 110 may determine the identity of the object based on the determined object properties, such as, by analyzing and recognizing that ULD's have various characteristics (e.g., the object size, object edges, etc.) that at least partially match the determined object properties. As a further example, sensing agents 110 may be preloaded with object property data corresponding to ULD's, humans, and/or the like, such that sensing agents 110 may compare the determined object properties against the preloaded data.

In response to being unable to locate a match of the object model, system controller 330 may transmit to the corresponding sensing agent 110 data indicating that the detected object is a non-ULD object. In response to locating a match of the object model and/or the object properties, system controller 330 may transmit to the corresponding sensing agent 110 data indicating that the detected object is a ULD.

In various embodiments, method 401 may comprise generating a non-ULD alert in response to detecting a non-ULD object (Step 412). Sensing agent 110 may be configured to generate the non-ULD alert based on one or more alert rules. For example, the alert rules may comprise data commanding sensing agent 110 to always generate a non-ULD alert in response to detecting a non-ULD object, to generate a non-ULD alert in response to the non-ULD object being in the path of an ULD, and/or any other suitable and/or desired alert rule. Method 401 may comprise transmitting the non-ULD alert (Step 414). With brief reference again to FIG. 3, sensing agent 110 may transmit the non-ULD alert to system controller 330. In various embodiments, system controller 330 may be configured to alert a human operator in response to receiving the non-ULD alert. System controller 330 may also be configured to transmit the non-ULD alert to a maintenance system and/or the like to alert maintenance personnel of a non-ULD object being detected in cargo deck 12. System controller 330 may also communicate, via network 120, to one or more PDU's in cargo deck 12 to de-energize and cease movement of ULD's through cargo deck 12. For example, ceasing movement of the ULD's through cargo deck 12 may provide safety benefits while the non-ULD object is investigated and/or removed from cargo deck 12.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A sensing agent, comprising:
a sensing unit configured to monitor a sensing zone; and
a computing unit in electronic communication with the sensing unit, wherein in response to the sensing unit detecting an object in the sensing zone, the computing unit is configured to determine an object physical property based on a physical characteristic of the object, wherein the computing unit is configured to identify the object as a unit load device ("ULD") or a non-ULD object based on the object physical property, and wherein the object physical property comprises at least one of an image of the object, a video of the object, an object dimension, an object shape, an object characteristic, an object orientation, an object location, an object weight, or point cloud data, wherein the object physical property does not include a reading of an identification tag or a label.

2. The sensing agent of claim 1, wherein the sensing unit comprises at least one of a camera, a structured light sensor, a light detection and ranging (LiDAR) sensor, an infrared sensor, a depth sensor, a 3D scanner, an ultrasound range finder, a radar sensor, or a weight sensor.

3. The sensing agent of claim 1, wherein the computing unit is configured to generate an object model based on the object physical property.

4. The sensing agent of claim 3, wherein the computing unit is configured to identify the object as the ULD or the non-ULD object based on the object model.

5. The sensing agent of claim 1, wherein the computing unit is configured to generate a non-ULD alert in response to detecting the non-ULD object.

6. The sensing agent of claim 5, wherein the non-ULD alert is generated based on an alert rule.

7. A method, comprising:
monitoring, by a sensing agent, a cargo deck, wherein the sensing agent is configured to monitor a sensing zone defining a logical boundary within the cargo deck;
detecting, by the sensing agent, an object in the cargo deck in response to the object being moved into the sensing zone;
determining, by the sensing agent, an object property based on a physical characteristic of the object;
identifying, by the sensing agent, the object as a ULD or a non-ULD object based on the object property; and
generating, by the sensing agent, a non-ULD alert in response to at least one of identifying the object as the non-ULD object or the non-ULD object being in the path of a second ULD.

8. The method of claim 7, further comprising generating, by the sensing agent, an object model based on the object property.

9. The method of claim 8, wherein the step of identifying the object as the ULD or the non-ULD object comprises comparing at least one of the object model or the object property against at least one of a stored ULD model or a stored ULD property.

10. The method of claim 7, wherein the object property comprises at least one of an image of the object, a video of the object, an object dimension, an object shape, an object characteristic, an object orientation, an object location, an object weight, or point cloud data, wherein the object property does not include a reading of an identification tag or a label.

11. The method of claim 7, wherein the sensing agent comprises at least one of a sensing unit, a computing unit, or a communication unit in electronic communication with each other.

12. The method of claim 11, wherein the sensing unit comprises at least one of a camera, a structured light sensor, a light detection and ranging (LiDAR) sensor, an infrared sensor, a depth sensor, a 3D scanner, an ultrasound range finder, a radar sensor, or a weight sensor.

13. An aircraft, comprising:
a cargo deck defined by an aircraft envelope within the aircraft; and
a sensing agent coupled to the aircraft envelope, wherein the sensing agent is configured to monitor a sensing zone defining a logical boundary within the cargo deck, wherein in response to the sensing agent detecting an object in the sensing zone, the sensing agent is configured to determine an object property based on a physical characteristic of the object, wherein the sensing agent is configured to identify the object as a ULD or a non-ULD object based on the object property and wherein the object property comprises at least one of an image of the object, a video of the object, an object dimension, an object shape, an object physical characteristic, an object orientation, an object location, an object weight, or point cloud data, wherein the object property does not include a reading of an identification tag or a label.

14. The aircraft of claim 13, wherein the sensing agent is coupled to the aircraft envelope on at least one of a cargo deck ceiling or an inner surface of the aircraft envelope.

15. The aircraft of claim 13, wherein the sensing agent comprises at least one of a sensing unit, a computing unit, or a communication unit in electronic communication with each other.

16. The aircraft of claim 13, wherein the sensing unit comprises at least one of a camera, a structured light sensor, a light detection and ranging (LiDAR) sensor, an infrared sensor, a depth sensor, a 3D scanner, an ultrasound range finder, a radar sensor, or a weight sensor.

* * * * *